(12) United States Patent
Hu

(10) Patent No.: US 7,765,355 B2
(45) Date of Patent: Jul. 27, 2010

(54) DETECTING CIRCUIT FOR IEEE 1394 DEVICE

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 85 days.

(21) Appl. No.: 12/178,657

(22) Filed: Jul. 24, 2008

(65) Prior Publication Data

US 2009/0327567 A1    Dec. 31, 2009

(30) Foreign Application Priority Data

Jun. 27, 2008    (CN) .................. 2008 1 0302394

(51) Int. Cl.
*G06F 13/00*    (2006.01)

(52) U.S. Cl. ................ 710/313; 710/17; 710/306

(58) Field of Classification Search .............. 710/8, 710/10, 15, 17, 306, 313
See application file for complete search history.

(56) References Cited

U.S. PATENT DOCUMENTS 6,510,485 B1 *    1/2003    Shin ................... 710/315

OTHER PUBLICATIONS

Anderson, Don; FireWire System Architecture, Second Edition; MindShare, Inc.; Chapter 14—Bus Reset (Initialization); 1999.*

* cited by examiner

*Primary Examiner*—Glenn A Auve
(74) *Attorney, Agent, or Firm*—Zhigang Ma

(57) ABSTRACT

An IEEE 1394 device detecting circuit includes a south bridge chip, a control device, an IEEE 1394 interface, and a resistor. The control device includes a power reset pin, a bus reset pin, and a cable power pin. The control device is connected to the south bridge chip through the bus reset pin, which is further connected to the power reset pin. The cable power pin is connected to a direct current power through the resistor. The control device is further connected to the IEEE 1394 interface, which is connected to an IEEE 1394 device.

6 Claims, 1 Drawing Sheet

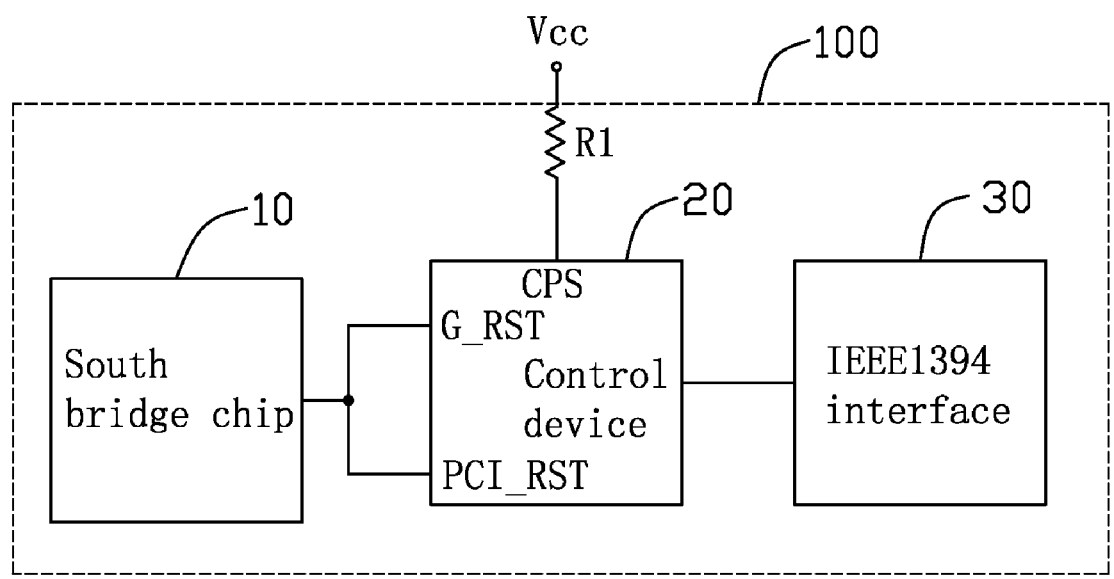

DETECTING CIRCUIT FOR IEEE 1394 DEVICE

BACKGROUND

1. Field of the Invention

The present invention relates to detecting circuits, and particularly to an IEEE 1394 device detecting circuit.

2. Description of the Related Art

Conventionally, when IEEE 1394 devices are inserted into computers via IEEE 1394 interfaces, the computers can immediately recognize, and control them. But sometimes, the computers cannot detect the IEEE 1394 devices because the control chips for the IEEE 1394 interfaces cannot timely enter a working status.

What is needed, therefore, is a circuit which can reliably detect IEEE 1394 devices.

BRIEF DESCRIPTION OF THE DRAWING

The drawing is a circuit diagram of an IEEE 1394 device detecting circuit in accordance with an embodiment of the present invention.

DETAILED DESCRIPTION

Referring to the drawing, an IEEE 1394 device detecting circuit 100 in accordance with an embodiment of the present invention includes a south bridge chip 10, a control device 20, an IEEE 1394 interface 30, and a resistor R1. The control device 20 includes a power reset pin G_RST, a bus reset pin PCI_RST, and a cable power pin CPS. The control device 20 is connected to the south bridge chip 10 through the bus reset pin PCI_RST, which is further connected to the power reset pin G_RST. The cable power pin CPS is connected to a direct current power Vcc through the resistor R1. The control device 20 is also connected to the IEEE 1394 interface 30, which is connected to an IEEE 1394 device. The power reset pin G_RST controls the working status of the control device 20. The control device 20 works only when the power reset pin G_RST reaches a valid level. In this embodiment, the valid level of the power reset pin G_RST and the bus reset pin PCI_RST is low. The resistance of the resistor R1 ranges from 370 kΩ to 410 kΩ. In particular, when the resistance of the resistor R1 is about 390 kΩ, the IEEE 1394 device detecting circuit 100 can detect the IEEE 1394 device without delay.

When the IEEE 1394 device is connected to a computer via the IEEE 1394 interface 30, the control device 20 receives a signal from the IEEE 1394 interface 30, and the bus reset pin PCI_RST immediately reaches the valid level. In general, if an elapsed time between connecting the IEEE 1394 device to the computer and the time when the bus reset pin PCI_RST reaches the valid level is less than an experiential value, the control device 20 can enter working status immediately. If not, the control device 20 does not work. In this embodiment, the experiential value is 2 milliseconds. Because the power reset pin G_RST is connected to the bus reset pin PCI_RST, it also immediately reaches the valid level. Therefore, the control device 20 achieves a working status in a timely manner. The control device 20 accepts the signal and transmits it to the south bridge chip 10. Thus, the computer can recognize and control the IEEE 1394 device.

The foregoing description of the exemplary embodiments of the invention has been presented only for the purposes of illustration and description and is not intended to be exhaustive or to limit the invention to the precise forms disclosed. Many modifications and variations are possible in light of the above everything. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An IEEE 1394 device detecting circuit, comprising:
a south bridge chip;
a resistor;
a control device comprising a bus reset pin connected to the south bridge chip, a power reset pin connected to the bus reset pin, and a cable power pin connected to a power supply through the resistor; and
an IEEE 1394 interface connected to the control device.

2. The IEEE 1394 device detecting circuit as claimed in claim 1, wherein the resistance of the resistor ranges from 370 kΩ to 410 kΩ.

3. The IEEE 1394 device detecting circuit as claimed in claim 1, wherein the resistance of the resistor is about 390 kΩ.

4. A detecting method for IEEE 1394 device, comprising:
inserting an IEEE 1394 device into a computer through an IEEE 1394 interface;
transmitting a signal to a control device from the IEEE 1394 interface;
resetting a bus reset pin and a power reset pin of the control device according to a logic level of the signal;
activating the control device; and
transmitting the signal by the control device to a south bridge chip.

5. The detecting method for IEEE 1394 device as claimed in claim 4, wherein the elapsed time between the inserting step and the resetting step is less than a predetermined value.

6. The detecting method for IEEE 1394 device as claimed in claim 5, wherein the predetermined value is 2 milliseconds.

* * * * *